United States Patent [19]

Kirk

[11] Patent Number: 4,966,779

[45] Date of Patent: Oct. 30, 1990

[54] STABLE, WATER MISCIBLE EMULSION COMPRISING A FAT-SOLUBLE VITAMIN

[75] Inventor: Paula S. Kirk, Dearborn Heights, Mich.

[73] Assignee: BASF Corporation, Wyandotte, Mich.

[21] Appl. No.: 454,202

[22] Filed: Dec. 21, 1989

[51] Int. Cl.$^5$ ............................................. A23L 1/302
[52] U.S. Cl. .......................................... 426/72; 426/73; 426/602; 426/603; 252/312; 514/938
[58] Field of Search .................. 426/72, 73, 602, 603; 252/312; 568/824; 549/408; 552/299; 514/938

[56] References Cited

U.S. PATENT DOCUMENTS

| | | | |
|---|---|---|---|
| 2,708,628 | 5/1955 | Bauernfund | 426/73 |
| 4,316,917 | 2/1982 | Antoshkew | 426/73 |
| 4,493,847 | 1/1985 | Mizushima | 514/938 |
| 4,522,743 | 6/1985 | Horn | 426/73 |
| 4,563,354 | 1/1986 | Chang | 514/938 |
| 4,590,086 | 5/1986 | Takahashi | 252/312 |
| 4,803,087 | 2/1989 | Karinen | 426/73 |

FOREIGN PATENT DOCUMENTS 708130  4/1965  Canada ................................ 426/73

*Primary Examiner*—Carolyn Paden
*Attorney, Agent, or Firm*—Rubert B. Hurley

[57] ABSTRACT

A stable, water-miscible emulsion comprises specific proportions of (a) a fat-soluble vitamin (b) a liquid, edible vegetable oil, (c) a modified lecithin (d) a sucrose ester (e) sorbitan monooleate (f) a sugar alcohol and (g) water. The emulsion has an average droplet size of from about 0.5 microns to about 8 microns. The emulsion does not separate into distinct phases upon standing for prolonged periods of time.

18 Claims, No Drawings

STABLE, WATER MISCIBLE EMULSION COMPRISING A FAT-SOLUBLE VITAMIN

BACKGROUND OF THE INVENTION

The present invention pertains to fat-soluble vitamins, more specifically, to stable, water-miscible, emulsified formulations thereof. Such formulations are useful as additives for food products, such as cereal fortification formulas. However, many nutritional uses for such formulations have been contemplated other than cereal fortification.

BRIEF SUMMARY OF THE INVENTION

It has been found that emulsions comprising fat-soluble vitamins cannot easily be made into stable emulsions without incorporating ethoxylated surfactants into the emulsion. The inventor of the formulation described herein has unexpectedly found that a particular combination of ingredients permits the formation of an emulsion which is much more stable than otherwise similar emulsions produced without the presence of ethoxylated surfactants.

The present invention pertains to a stable, water-miscible emulsion which comprises several ingredients. First, the emulsion comprises a fat-soluble vitamin in an amount of from about 5 weight percent to about 55 weight percent. Second, the emulsion comprises a liquid, edible vegetable oil. The vegetable oil is present in an amount of from about 3 weight percent to about 30 weight percent. Third, the emulsion comprises a modified lecithin in an amount of from about 0.5 weight percent to about 10 weight percent. Fourth, the emulsion comprises a sucrose ester in an amount of from about 10 weight percent to about 19 weight percent. Fifth, the emulsion comprises a sorbitan fatty acid ester in an amount of from about 3.5 weight percent to about 12 weight percent. Sixth, the emulsion comprises a sugar alcohol in an amount of from about 16 weight percent to about 36 weight percent. Seventh, the emulsion comprises water in an amount from about 5 weight percent to about 30 weight percent. All of the above weight percents are based on the total weight of the emulsion. Finally, the emulsion must have an average droplet size (i.e. average droplet diameter) of from about 0.5 micron to about 8 microns.

It is an object of the present invention to provide an emulsion of a fat-soluble vitamin, which emulsion is stable (i.e. will not exhibit phase separation) during storage.

Furthermore, it is an object of the present invention to provide a water-miscible emulsion which comprises a fat-soluble vitamin.

Furthermore, it is an object of the present invention to provide a fat-soluble vitamin emulsion suitable for cereal fortification.

Furthermore, it is an object of the present invention to provide an emulsion comprising a fat-soluble vitamin, which emulsion is useful as an additive for food products.

Furthermore, it is an object of the present invention to provide a stable emulsion comprising a fat-soluble vitamin, wherein the emulsion is substantially free of ethoxylated surfactants.

Furthermore, it is an object of the present invention to provide a stable emulsion comprising a fat-soluble vitamin wherein the emulsion has a low flavor and odor profile.

Furthermore, it is an object of the present invention to provide a stable emulsion comprising a fat-soluble vitamin in which the vitamin does not crystallize out at a temperature of about 50° F.

DETAILED DESCRIPTION OF THE PREFERRED EMBODIMENTS

The present invention pertains to a stable emulsion of a fat-soluble vitamin. The four most common fat-soluble vitamins are: vitamin A (retinol), vitamin D (calciferol), vitamin E (tocopherol), and vitamin K (phylloquinone and menaquinone). The emulsion of the present invention generally comprises one or more of these fat-soluble vitamins. Most preferably, the emulsion comprises vitamin A as the fat-soluble vitamin component therein. Although the fat-soluble vitamin present in the emulsion is generally present in an amount of from about 5 weight percent to about 55 weight percent, it is preferred that the fat-soluble vitamin is present in the emulsion in an amount of from about 5 weight percent to about 40 weight percent, based on the weight of the emulsion. It is most preferable that the fat-soluble vitamin is present in the emulsion in an amount of from about 15 weight percent to about 25 weight percent.

The edible oil utilized in the emulsion of the present invention is a liquid, edible vegetable oil. Any vegetable oil which is a liquid at room temperature is considered to be operable for purposes of the emulsion of the present invention. Liquid, edible vegetable oils are known to be unhydrogenated oils. Preferred vegetable oils have been "winterized" in order to prevent crystallization of the oil at low temperatures. ["Winterizing" is achieved by chilling the vegetable oil to remove high-melt glycerines which crystallize at refrigeration temperatures. The oil is cooled to 5° C. until this stearine component is well crystallized. The solids are then filtered out at this low temperature. Cottonseed oil is most often winterized because it contains a higher content of the stearine component than corn, soybean, sunflower, or olive oil.] Preferred vegetable oils have good stability (i.e. shelf-life), as well as low flavor profiles. Especially preferred vegetable oils for use in the emulsion of the present invention comprise at least one member selected from the group consisting of corn oil, soybean oil, cottonseed oil, peanut oil, sunflower oil, safflower oil, olive oil and canola oil. A particularly preferred vegetable oil for use in the emulsion of the present invention is corn oil obtained from Argo Ingredients Corporation, 600 East Algonquin Road, Des Plaines, Ill. 60016. In general, the vegetable oil should be polyunsaturated to a degree of from about 26 percent to about 78 percent. Although the oil may, in general, be present in the emulsion in an amount of from about 3 weight percent to about 30 weight percent it is preferred that the oil is a vegetable oil present in an amount of from about 3 weight percent to about 10 weight percent, and it most preferred that the oil is corn oil present in an amount of from about 4 weight percent to about 6 weight percent, based on the weight of the emulsion.

The emulsion of the present invention further comprises a modified lecithin. As used herein, the term "modified lecithin" refers to a lecithin having a greater number of hydrophilic groups thereon in comparison with "pure lecithin" (i.e. a phosphatidyl choline). Preferably the "modified lecithin" is a lecithin which has been enzyme modified in order to provide a different functionality, i.e., in order to provide a hydrophilic or lipophilic function. In general, the modified lecithin present in the emulsion has an HLB value (i.e. a hydrophilic/lipohilic balance) of from about 6 to about 14. Preferably the lecithin has an HLB value of from about 6 to about 10. Most preferably, the modified lecithin has an HLB value of about 8. Although the modified lecithin is generally present in the emulsion in an amount of from about 0.5 weight percent to about 10 weight percent based on the weight of the emulsion, it is preferred that the modified lecithin is present in an amount of from about 0.5 weight percent to about 6 weight percent. A preferred modified lecithin can be obtained from Central Soya, Chemurgy Division, P.0. Box 1400, Fort Wayne, Ind. 46801, the modified lecithin being known as Blendmax ® 322. This modified lecithin has an HLB value of about 8.

The emulsion of the present invention further comprises sorbitan monooleate. Sorbitan monooleate, as used in the emulsion of the present invention, functions as a lipophilic emulsifier and nonionic surfactant. Although the sorbitan monooleate is generally present in the emulsion in an amount of from about 3.5 weight percent to about 12 weight percent, it is preferable that the sorbitan monooleate is present in an amount of from about 4 weight percent to about 12 weight percent. It is most preferable that the sorbitan monooleate is present in an amount of from about 5 weight percent to about 7 weight percent. A preferred sorbitan monooleate can be obtained from Mazer Chemicals, a Division of PPG Chemicals Group, 3938 Porett Drive, Gurnee, Ill. 60031. The sorbitan monooleate available from Mazer is known as SMAZ 80K.

The emulsion of the present invention further comprises a sucrose ester. The sucrose ester is a reaction product of sucrose and an unethoxylated fatty acid. The unethoxylated fatty acid may be at least one member selected from the group consisting of stearic/palmitic esters, stearate esters, acetylated stearate esters, monolaurate esters, and stearate/monolaurate esters. Preferably the unethoxylated fatty acid is stearate/monolaurate acid, whereby the resulting sucrose ester is sucrose cocoate. Although sucrose ester may be present in the emulsion in an amount of from about 10 weight percent to about 19 weight percent, it is preferred that the sucrose ester is present in the emulsion in an amount of from about 14 weight percent to about 18 weight percent, based on the weight of the emulsion. It is most preferred that the sucrose ester is present in the emulsion in an amount of from about 15 weight percent to about 17 weight percent. The most preferred sucrose ester, i.e. sucrose monococoate, can be obtained from Croda, Inc., 183 Madison Avenue, New York, N.Y. 10016. This sucrose ester is known as Crodesta ® SL-40.

The emulsion of the present invention further comprises a sugar alcohol. The term "sugar alcohol" is herein defined as including the following group of compounds: glycerol, mannitol, sorbitol, and xylitol. Preferred sugar alcohols are glycerol and sorbitol. The most preferred sugar alcohol is glycerol. In general, the sugar alcohol is present in the emulsion in an amount of from about 16 weight percent to about 36 weight percent, based on the weight of the emulsion. However, it is preferred that the sugar alcohol is present in an amount of from about 16 weight percent to about 30 weight. It is most preferred that the sugar alcohol is present in an amount of from about 18 weight percent to about 22 weight percent.

The emulsion of the present invention further comprises water. Generally, the water is present in the emulsion in an amount of from about 5 weight percent to about 30 weight percent. However, it is preferable that the water is present in an amount of from about 10 weight percent to about 30 weight percent. It is most preferable that the water is present in the emulsion in an amount of from about 15 weight percent to about 25 weight percent.

The emulsion of the present invention may optionally further comprise propylene glycol. Generally, the propylene glycol is present in the emulsion in an amount of from about 0.5 weight percent to about 10 weight percent based on the weight of the emulsion. However, it is preferred that the emulsion comprises propylene glycol in an amount of from about 2 weight percent to about 5 weight percent. The propylene glycol functions as a solvent/diluent for the fat-soluble vitamin, and the propylene glycol further aids in emulsification of the fat-soluble vitamin.

The emulsion of the present invention may optionally further comprise a preservative. Preferably the preservative is potassium sorbate. Generally, the preservative is present in the emulsion in an amount of from about 0.01 weight percent to about 0.1 weight percent.

In general, the emulsion of the present invention should have an average droplet size (i.e. droplet diameter) of from about 0.5 microns to about 8 microns. However, it is preferred that the average emulsion droplet size is from about 0.5 microns to about 2 microns.

The present invention pertains to a "stable" emulsion. As used herein, the term "stable emulsion" refers to an emulsion which does not separate into oil and water phases upon standing. Separation of a standing emulsion is apparent to an observer because the emulsion will form strata (i.e. layers). Generally each layer is a distinct, continuous liquid phase. With regard to the desired emulsion of the present invention, separation is highly undesirable because the nutritionally fortifying substance present (i.e. the fat-soluble vitamin) will become unevenly distributed in any resulting product into which the now-stratified mixture is incorporated. Furthermore, since it is not infrequent that a vitamin fortification formula will have to remain standing in storage for a significant period of time before incorporation into a food or feed product, it is highly desirable that the emulsion remains stable so that the emulsion can be used directly rather than having to be re-emulsified. Furthermore, it should be noted that the emulsion of the present invention does not contain ethoxylated surfactants which are considered toxic in some countries (e.g. Japan) but which are, at certain levels, acceptable for use in food and feed products in the United States. Emulsion stability is well-recognized as being easily achieved through the use of ethoxylated surfactants. However, the inventor of the present invention has unexpectedly discovered an emulsion which remains relatively stable in spite of the absence of ethoxylated surfactants therein. Accordingly, such a stable emulsion is advantageous in that it does not contain emulsifying/surface active components that may be considered toxic or harmful in some countries.

Several tests for stability of the emulsion have been carried out. A first stability test involves letting the emulsion stand, at room temperature, for a period of time. It has been found that emulsions of the present invention will not undergo substantial phase separation when left standing for periods as long as four months. Ideally, this "shelf-stability" of the emulsion will extend for periods of from about 6 to about 12 months. Furthermore, in addition to phase stability (i.e. the absence of phase separation), ideally the emulsion droplet size remains substantially the same during the entire shelf-stability.

A second emulsion stability test involves freezing and thawing the emulsion in successive cycles. For example, an emulsion sample is first frozen in a freezer, the emulsion being held in the freezer overnight. Thereafter, the emulsion is removed from the freezer and allowed to stand in an ambient environment until the emulsion returns to ambient temperature (i.e. approximately 20° C.) then the emulsion droplet size is checked (e.g. under a microscope at 40x power). The emulsion is also checked for any obvious signs of phase separation. Two additional freeze-thaw cycles are then carried out on the emulsion sample. The emulsion is considered stable if there is no significant phase separation or emulsion droplet size enlargement after completion of three freeze-thaw cycles.

A third emulsion stability test maybe carried out by centrifuging the emulsion. The emulsion is centrifuged at 2000 rpm for 15 minutes. It has been found that if, after this centrifuging process, the oil phase appears separated from the water phase, an identical but non-centrifuged emulsion will probably undergo substantial phase separation within one to two weeks upon standing. However, if, after centrifuging the emulsion does not undergo any substantial phase separation, the emulsion is considered "stable" for purposes of the present invention.

EXAMPLE 1

This example illustrates a process for making a preferred emulsion of the present invention. As used in this example and all other examples found herein, the term "parts" refers to part by weight based on the weight of the completed emulsion. First, 22.0 parts of Vitamin A were added to a vessel and heated to a temperature of about 110° F. In a separate vessel, 1.2 parts of lecithin, 21.19 parts of glycerol, 6.18 of sorbitan monooleate, 5.89 parts of corn vegetable oil, 3.53 parts of propylene glycol, and 16.48 parts of sucrose cocoate were added, following which these ingredients were heated to a temperature of approximately 120° Farenheit. The ingredients were continually stirred during heating. Next, 0.10 parts of potassium sorbate (a preservative) were dissolved in 23.54 parts of water, and this solution was added to the heated vessel containing the lecithin, glycerol, etc. After the addition, the heated vessel was continuously stirred to insure thorough mixing of the potassium sorbate solution. Thereafter, the Vitamin A was added to the heated vessel, and mixed thoroughly with the ingredients therein, during which period heating was maintained. Finally, the ingredients were homogenized until an average emulsion droplet diameter of approximately 2 microns was obtained. Homogenization was carried out in a Virtishear Tissue Homogenizer which was operated under conditions so that an emulsion droplet size of 2 microns was obtained in approximately 5 minutes of homogenization. The resulting emulsion was an oil-in-water emulsion. The emulsion had a pH of approximately 6.63. The resultant emulsion was milky, water-miscible, and stable. At storage temperatures below 60° F., the Vitamin A did not crystalize out in this matrix. The emulsion should be warmed and mixed before use to insure homogeniety and ease in pouring. In terms of emulsion stability with respect to phase separation and emulsion droplet size, the emulsion was characterized as stable.

EXAMPLE 2

This example was carried out exactly as described in Example 1 except that 0.06 parts of Vitamin D was added to the Vitamin A, and the combined Vitamins A and D were heated together until the Vitamin D was melted (at about 160° F.). The mixture of Vitamin A and Vitamin D were then cooled to approximately 120° F. before being added to the heated vessel containing the lecithin, glycerol, etc. The resulting emulsion was stable.

EXAMPLES 3-13

Examples 3-13 were carried out in a manner similar to the manner utilized in Examples 1 and 2. Table 1 provides the proportions of each of the components utilized in Examples 3-13.

Examples 3-5 are within the scope of the present invention. The emulsions produced in these Examples were found to be stable. Note that each of these Examples utilizes all of the necessary components according to the invention, and that each component is within the range required in the present invention.

Examples 6-13 are comparative examples which are not within the scope of the present invention. Note that in each of these Examples, either one (or more) required component was absent, and/or one (or more) component was present in an amount outside of the range required for that component. Whereas the emulsions produced according to Examples 3-5 were stable, the emulsions produced according to Examples 6-13 exhibited one or more of the following undesirable characteristics: phase separation in less than 24 hours, foaminess, and failure of the entire emulsion to dissolve in water.

TABLE 1

| | | | | | EXAMPLES 3 AND 4 | | | | | |
|---|---|---|---|---|---|---|---|---|---|---|
| Example No. | Lecithin (pts) | Glycerol (pts) | Sorbitan Monooleate (pts) | Oil (pts) | Sucrose Cocoate (pts) (Crodesta ® SL-40) | Propylene Glycol (pts) | Vitamin A Palmitate (pts) | Water (pts) | Potassium Sorbitate (pts) | Vitamin D (pts) |
| 3 | 1.23 (Blendmax ® M) | 22.02 | 6.42 | 6.12 (Corn Oil) | 17.13 | — | 22.63 | 24.47 | — | — |
| 4 | 4.61 (Blendmax ® 322) | 21.88 | 6.05 | 5.76 (Cottonseed Oil) | 16.12 | 3.45 | 24.74 (Vitamin E) | 17.24 | 0.12 | — |
| 5 | 4.36 (Blendmax ® 322) | 20.69 | 5.72 | 5.44 (Soybean Oil) | 15.24 | 3.27 | 23.34 | 21.78 | 0.11 | — |
| 6 | 3.78 (Blendmax ® 322) | 17.94 | 4.96 | 4.72 (Soybean Oil) | 26.44 | 2.83 | 20.29 | 18.89 | 0.10 | 0.05 |
| 7 | — | 23.31 | 9.20 | 6.13 (Corn Oil) | 17.18 | 3.68 | 22.09 | 18.40 | — | — |

TABLE 1-continued

EXAMPLES 3 AND 4

| Example No. | Lecithin (pts) | Glycerol (pts) | Sorbitan Monooleate (pts) | Oil (pts) | Sucrose Cocoate (pts) (Crodesta ® SL-40) | Propylene Glycol (pts) | Vitamin A Palmitate (pts) | Water (pts) | Potassium Sorbitate (pts) | Vitamin D (pts) |
|---|---|---|---|---|---|---|---|---|---|---|
| 8 | 1.79 | 26.91 | — | — | 8.52 (Crodesta ® F-50) | — | 31.39 | 31.39 | — | — |
| 9 | 1.56 | 28.03 | 8.18 | 3.89 (Corn Oil) | 21.80 | 4.67 | 12.40 | 19.47 | — | — |
| 10 | 1.56 | 29.59 | 8.18 | 3.89 (Corn Oil) | 20.25 | 4.67 | 12.40 | 19.47 | — | — |
| 11 | 1.69 (Blendmax ® M) | 30.51 | 8.90 | — | 23.73 | 5.08 | 13.49 | 16.95 | — | — |
| 12 | 1.69 (Blendmax ® M) | 30.51 | 8.90 | — | 28.81 | — | 13.49 | 16.95 | — | — |
| 13 | 2.84 (Blendmax ® M) | — | 14.91 | — | 51.12 | 8.52 | 22.61 | — | — | — |

I claim:

1. A stable, water-miscible emulsion comprising:
   A. a fat-soluble vitamin in an amount of from about 5 weight percent to about 55 weight percent; and
   B. a liquid, edible vegetable oil which is polyunsaturated to a degree of from about 26 percent to about 78 percent, the vegetable oil being present in an amount of from about 3 weight percent to about 30 weight percent; and
   C. a modified lecithin in an amount of from about 0.5 weight percent to about 10 weight percent the lecithin having an HLB value of from about 6 to about 14; and
   D. a sucrose ester in an amount of from about 10 weight percent to about 19 weight percent; and
   E. sorbitan monooleate in an amount of from about 3.5 weight percent to about 12 weight percent; and
   F. a sugar alcohol in an amount of from about 16 weight percent to about 36 weight percent; and
   G. water in an amount of from about 5 weight percent to about 30 weight percent; and
   H. the emulsion having an average droplet size of from about 0.5 microns to about 8 microns.

2. An emulsion as described in claim 1 wherein the emulsion further comprises propylene glycol in an amount of from about 0.5 weight percent to about 10 weight percent.

3. An emulsion as described in claim 1 wherein the fat-soluble vitamin is at least one member selected from the group consisting of vitamin A, vitamin D, vitamin E, and vitamin K.

4. An emulsion as described in claim 3 wherein the emulsion comprises vitamin A.

5. An emulsion as described in claim 1 wherein the vegetable oil is unsaturated and wherein the vegetable oil is at least one member selected from the group consisting of corn oil, soybean oil, cotton seed oil, peanut oil, safflower oil, canola oil, and olive oil.

6. An emulsion as described in claim 5 wherein the vegetable oil has been winterized.

7. An emulsion as described in claim 1 wherein the modified lecithin has an HLB value of from about 6 to about 10.

8. An emulsion as described in claim 7 wherein a modified lecithin has an HLB value of about 8.

9. An emulsion as described in claim 1 wherein the sucrose ester is the reaction product of sucrose and unethoxylated fatty acid.

10. An emulsion as described in claim 9 wherein the sucrose ester is a reaction product of sucrose and unethoxylated fatty acid which is at least one member selected from the group consisting of stearic acid, palmitic acid, and oleic acid.

11. An emulsion as described in claim 10 wherein the sucrose ester is sucrose cocoate.

12. An emulsion as described in claim 1 wherein the sorbitan fatty acid ester is at least one member selected from the group consisting of sorbitan monooleate, sorbitan monolaurate, sorbitan monostearate, sorbitan monopalmitate, and sorbitan tristearate.

13. An emulsion as described in claim 12 wherein the sorbitan fatty acid ester is sorbitan monooleate.

14. An emulsion as described in claim 1, wherein the sugar alcohol is a member selected from the group consisting of glycerol, sorbitol, mannitol, xylitol.

15. An emulsion as described in claim 14, wherein the sugar alcohol is at least one member selected from the group consisting of glycerol and sorbitol.

16. An emulsion as described in claim 1, wherein the fat-soluble vitamin is vitamin A, and the vitamin A is present in the emulsion in an amount of from about 5 weight percent to about 40 weight percent, and wherein the vegetable oil is present in an amount of from about 3 weight percent to about 10 weight percent, and wherein the lecithin is present in an amount of from about 0.5 weight percent to about 6 weight percent, and wherein the sucrose ester is present in an amount of from about 14 weight percent to about 18 weight percent, and wherein the sorbitan fatty acid ester is sorbitan monooleate, the sorbitan monooleate being present in an amount of from about 4 weight percent to about 12 weight percent, the sugar alcohol being at least one member selected from the group consisting of glycerol and sorbital, the sugar alcohol being present in an amount from about 16 weight percent to about 30 weight percent, the emulsion further comprising water in an amount of from about 10 weight percent to about 30 weight percent.

17. An emulsion as described in claim 16 wherein the emulsion further comprises propylene glycol in an amount from about 0.5 weight percent to about 10 weight percent.

18. An emulsion as described in claim 1 wherein the emulsion comprises: vitamin A in an amount of from about 15 weight percent to about 25 weight percent, a vegetable oil in an amount of from about 4 weight percent to about 6 weight percent, the vegetable oil being a member selected from the group consisting of corn oil, cottonseed oil, soybean oil, and the lecithin being present in an amount of from about 0.5 weight percent to about 6 weight percent, the lecithin being a modified lecithin having an average HLB of about 8, the sucrose ester being present in an amount of from about 15 weight percent to about 17 weight percent, the sucrose ester being sucrose cocoate, the sorbitan fatty acid ester being present in an amount of from about 5 weight percent to about 7 weight percent, the sorbitan fatty acid ester being sorbitan monooleate, the sugar alcohol being present in an amount of from about 18 weight percent to about 22 weight percent, the sugar alcohol glycerol, the water being present in an amount of from about 15 weight percent to about 25 weight percent, and wherein the emulsion further comprises propylene glycol in an amount of from about 2 weight percent to about 5 weight percent, and wherein the average emulsion droplet size is from about 0.5 microns to about 8 microns.

* * * * *